US012448818B1

(12) United States Patent
Flannery et al.

(10) Patent No.: US 12,448,818 B1
(45) Date of Patent: Oct. 21, 2025

(54) SQUEEZE AND SLIDE TO OPEN GATE LATCH

(71) Applicant: Carlson Pet Products, Inc., Longboat Key, FL (US)

(72) Inventors: Mark A. Flannery, Longboat Key, FL (US); Brian G. Linehan, Saint Paul, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 0 days.

(21) Appl. No.: 17/384,753

(22) Filed: Jul. 24, 2021

Related U.S. Application Data

(63) Continuation of application No. 16/558,136, filed on Sep. 1, 2019, now Pat. No. 11,072,946, which is a continuation of application No. 15/285,469, filed on Oct. 4, 2016, now Pat. No. 10,400,487, which is a continuation of application No. 14/181,660, filed on Feb. 15, 2014, now Pat. No. 9,464,467.

(60) Provisional application No. 61/765,681, filed on Feb. 15, 2013.

(51) Int. Cl.

| | |
|---|---|
| ***E05B 65/00*** | (2006.01) |
| ***E05B 13/00*** | (2006.01) |
| ***E05C 1/08*** | (2006.01) |
| ***E05C 1/14*** | (2006.01) |
| ***E05C 17/30*** | (2006.01) |
| ***E06B 11/02*** | (2006.01) |
| *E05C 1/12* | (2006.01) |
| *E06B 9/00* | (2006.01) |

(52) U.S. Cl.
CPC ........ *E05B 65/0007* (2013.01); *E05B 13/002* (2013.01); *E05B 65/0014* (2013.01); *E05C 1/085* (2013.01); *E05C 17/30* (2013.01); *E06B 11/02* (2013.01); *E05C 1/12* (2013.01); *E06B 2009/002* (2013.01)

(58) Field of Classification Search
CPC ............. E05B 65/0007; E05B 65/0014; E05B 13/002; E05B 11/02; E06B 2009/002; E05C 1/085; E05C 1/12
See application file for complete search history.

(56) References Cited

U.S. PATENT DOCUMENTS

| | | | |
|---|---|---|---|
| 3,322,451 A | 5/1967 | Bredemus | |
| 6,446,395 B2 | 9/2002 | Rogers | |
| 7,540,046 B1 | 6/2009 | Lai | |
| 7,950,184 B2 | 5/2011 | Flannery | |
| 7,963,575 B2 | 6/2011 | Mayo | |
| 8,607,502 B2 | 12/2013 | Flannery | |
| 8,615,928 B2 * | 12/2013 | Wang .................... | E04H 17/013 49/55 |
| 2002/0002795 A1 | 1/2002 | Rogers | |
| 2006/0260195 A1 | 11/2006 | Witman | |
| 2007/0074453 A1 | 4/2007 | Flannery | |

(Continued)

FOREIGN PATENT DOCUMENTS

| | | |
|---|---|---|
| DE | 202012103363 | 10/2012 |

*Primary Examiner* — Kristina R Fulton
*Assistant Examiner* — Thomas L Neubauer

(57) ABSTRACT

A gate latch apparatus is disclosed for a residential safety gate. The gate latch apparatus includes a housing having opposable buttons. The buttons are squeezed to unlock opposing slides. The slides are slid to in turn slide a latch out of a latch receiver to permit the residential safety gate to be opened.

11 Claims, 10 Drawing Sheets

(56) References Cited

U.S. PATENT DOCUMENTS

| | | | | |
|---|---|---|---|---|
| 2008/0191497 | A1* | 8/2008 | Mayo | E06B 9/04 292/169 |
| 2008/0256865 | A1 | 10/2008 | Trujillo | |
| 2009/0064595 | A1 | 3/2009 | Yates | |
| 2009/0293363 | A1 | 12/2009 | Flannery | |
| 2013/0086840 | A1 | 4/2013 | Marsden | |
| 2013/0160365 | A1 | 6/2013 | Flannery | |
| 2014/0259956 | A1 | 9/2014 | Bernhagen | |
| 2015/0184441 | A1 | 7/2015 | Linehan | |

* cited by examiner

SQUEEZE AND SLIDE TO OPEN GATE LATCH

This application is a continuation, and claims the benefit under 35 U.S.C. § 120, of U.S. Nonprovisional patent application Ser. No. 16/558,136 filed Sep. 1, 2019, which was a continuation, and claims the benefit under 35 U.S.C. § 120, of U.S. Nonprovisional patent application Ser. No. 15/285,469 filed Oct. 4, 2016, which was a continuation, and claims the benefit under 35 U.S.C. § 120, of U.S. Nonprovisional patent application Ser. No. 14/181,660 filed Feb. 15, 2014, which claims the benefit under 35 U.S.C. 119 (e) of U.S. Provisional patent application Ser. No. 61/765,681 filed Feb. 15, 2013, all of which applications are hereby incorporated by reference in their entireties into this application.

FIELD OF THE INVENTION

The present invention relates to a gate latch apparatus for a residential safety barrier having a gate and a barrier portion, particularly to a gate latch apparatus having a latch that rides on a horizontal support member of the gate, and specifically to a gate latch apparatus having opposing buttons that are squeezed to unlock opposing slides that are slid to in turn slide a latch out of a latch receiver.

BACKGROUND OF THE INVENTION

A safety gate for use inside of a house may be placed at the top or bottom of a staircase to prevent children from falling down the staircase or from climbing up and then falling down. Adults, however, must also open up and close the safety gate. Hence it may be advisable to incorporate into the gate a latch mechanism that is easy for an adult to operate but difficult for a child to operate.

It may also be advisable to have an ergonomic latch. Ergonomics may be defined as follows:

> Ergonomics (or human factors) is the scientific discipline concerned with the understanding of interactions among humans and other elements of a system, and the profession that applies theory, principles, data and methods to design in order to optimize human well-being and overall system performance.

An ergonomical system, machine or thing may have an easy to use interface. When ergonomics is taken into account, repetitive strain injuries and musculoskeletal disorders may be minimized.

An example of an ergonomic fit is a baseball glove conforming to the right or left hand. A greater ergonomical challenge is to design a piece of equipment for a user who may interact with the equipment with either the right or left hand or both hands. A still greater ergonomical challenge is to design a piece of equipment that by its structure discourages for safety purposes use by a child but that an adult may interact with easily.

SUMMARY OF THE INVENTION

A feature of the present invention is a gate latch apparatus for a residential safety barrier, where the residential safety barrier includes a gate and a barrier portion confronting the gate, where the gate is openable relative to the barrier portion, and where the gate includes a horizontally extending support member.

Another feature of the present invention is the provision in a gate latch apparatus, of a latch receptor engaged to the barrier portion, of a housing engaged to the gate across from the latch receptor where the housing includes a first housing side, a second housing side, and an open distal housing end and where the first and second housing sides oppose each other, and of a latch in the housing, where the latch is slideable in first and second directions, where the latch includes a distal latch end that extends out of the open distal housing end, where the latch is slideable in the first direction to slide the distal latch end out of the latch receptor, and where the latch is slideable in the second direction to slide the distal latch end into the latch receptor.

Another feature of the present invention is the provision in a gate latch apparatus, of a first button on a first housing side and a second button on a second housing side, where the first and second buttons are engaged to a housing in a normal position, where the first and second buttons are depressible inwardly into the housing such that the first and second pieces are squeezable in a direction toward one another, and where the first and second buttons when depressed are disengaged from the housing.

Another feature of the present invention is the provision in a gate latch apparatus, of a first slide on a first housing side and a second slide on a second housing side, where the first slide is held from sliding by a first button in a normal position, where the second slide is held from sliding by a second button in a normal position, where the first and second slides are slideable in the first direction when the first and second buttons are squeezed and disengaged from a housing, where the first and second slides when slid in the first direction also slide the latch in the first direction to slide a distal latch end out of a latch receptor to permit the gate to be opened relative to the barrier portion.

Another feature of the present invention is the provision in a gate latch apparatus, of a first slide including a first periphery and a second slide including a second periphery, where a first button is contained within the first periphery of the first slide and a second button is contained within the second periphery of the second slide.

Another feature of the present invention is the provision in a gate latch apparatus, of a first button being depressible inwardly on a first button axis and a second button being depressible inwardly on a second button axis, where a first slide slides on a first slide axis that is transverse of the first button axis, and where a second slide slides on a second slide axis that is transverse of the second button axis.

Another feature of the present invention is the provision in a gate latch apparatus, where a pair of first and second buttons when released from being depressed return to a normal position.

Another feature of the present invention is the provision in a gate latch apparatus, of a latch being engaged to and slideable on a horizontally extending support member of the gate.

Another feature of the present invention is the provision in a gate latch apparatus, of a latch being engaged to and slideable on a topmost horizontally extending support member of the gate.

Another feature of the present invention is the provision in a gate latch apparatus, of the latch including an open proximal latch end that receives a horizontally extending support member of the gate and that slides on the horizontally extending support member of the gate.

Another feature of the present invention is the provision in a gate latch apparatus, of the distal latch end being closed and slideable to and away from an end of the horizontally extending support member of the gate.

Another feature of the present invention is the provision in a gate latch apparatus, of the latch including a circumferentially extending section that extends over more than 50% of a circumference of a horizontally extending support member of the gate.

Another feature of the present invention is the provision in a gate latch apparatus, of a horizontally extending support member of the gate having four sides, and where a proximal open end of the latch includes four sides that extend over four of the four sides of the horizontally extending support member.

Another feature of the present invention is the provision in a gate latch apparatus, of the latch including a top and a bottom, where the top optionally includes a top slot and the bottom optionally includes a bottom slot, where each of the top and bottom slots have first and second ends, where a pin optionally extends through a horizontally extending support member of the gate and further extends through each of the top slot and bottom slot, and where the pin stops a sliding of the latch in each of the first and second directions when the respective first and second ends of each of the top and bottom slots hit the pin.

Another feature of the present invention is the provision in a gate latch apparatus, of the latch including first and second latch sides, where a first slide confronts the first side of the latch and a second slide confronts a second side of the latch such that the first slide when slid in a first direction pushes against the first side of the latch and the second slide when slid in the first direction pushes against the second side of the latch such that the latch is slid in the first direction.

Another feature of the present invention is the provision in a gate latch apparatus, of a pair of first and second latch sides including respective first and second transversely extending faces confronting respective first and second slides, where the first and second slides push against the respective first and second transversely extending faces to slide the latch in the first direction.

Another feature of the present invention is the provision in a gate latch apparatus, of each of the first and second slides having an external slide face, and each of the buttons having an external button face that is at all times one of a) generally flush with the external slide face and b) inwardly of the external slide face.

Another feature of the present invention is the provision in a gate latch apparatus, of the first slide protruding from the first housing side and the second slide protruding from the second housing side, of each of the first and second slides having an external slide face, of each of the buttons having an external button face that is at all times one of a) generally flush with the external slide face and b) inwardly of the external slide face.

Another feature of the present invention is the provision in a gate latch apparatus, of a first externally accessible lockable slide on a first housing side and a second externally accessible lockable slide on a second housing side, where the first and second externally accessible lockable slides are lockable and unlockable, where the first and second externally accessible lockable slides when unlocked push the latch in a first direction to draw a closed distal latch end out of a latch receptor.

Another feature of the present invention is a gate latch apparatus for a residential safety barrier having a gate and a barrier portion confronting the gate, where the gate is swingable relative to the barrier portion.

Another feature of the present invention is the provision in a gate latch apparatus, of a latch receptor engaged to a barrier portion, of a housing engaged to a gate, where the housing includes a first face and a second face, and where the first and second faces oppose each other, and of a latch slideable in the housing in first and second directions, where the latch includes a distal latch end section that is slideable into the latch receptor to fix the gate relative to the barrier portion, and where the distal latch end section is slideable out of the latch receptor to permit the gate to swing relative to the barrier portion.

Another feature of the present invention is the provision in a gate latch apparatus, of a first two-part button on a first housing face and a second two-part button on a second housing face.

Another feature of the present invention is the provision in a gate latch apparatus, of a two-part button having a first part and a second part that are engaged to each other.

Another feature of the present invention is the provision in a gate latch apparatus, of a first part of a two-part button being engagable to and disengageable from a housing, where the first part is engaged to the housing in a normal outwardly position, where the first part is disengaged from the housing in a depressed position, and where the first part is depressible inwardly on a first axis.

Another feature of the present invention is the provision in a gate latch apparatus, of a second part of a two part button being slideable relative to a housing in a first direction along a second axis when the first part is disengaged from the housing, where the second axis is disposed crosswise relative to the first axis, where the first part slides with the second part when the second part slides, and where the second part when slid in the first direction pushes against the latch to slide the distal latch end section out of the latch receptor.

An advantage of the present invention is that a two-step action is required for opening the gate. A button must be pushed and a slide must be slid. This two-step operation minimizes use of the gate by children.

Another advantage of the present invention is that the button must be held down before the slide can be slid. If the button is released before the sliding of the slide commences, the slide again becomes locked and the latch does not move. This hold down and slide feature further minimizes use of the gate by children.

Another advantage of the present invention is that the latch may be customized to operate a) when either a first or second button is pushed, or b) only when the first and second buttons are pushed in at the same time. For example, when the latch is manufactured to involve a deep button push (i.e., a relatively long slot 118 and/or relatively long tabs 114) or a relatively strong coil spring (i.e., one or more of coil springs 120, 146) or both such features, then the two buttons must be pushed in and the two slides must be slid to slide the latch to open the gate. Where either or both of such features are present, the design of the slide relative to the latch housing and the design of the button relative to the slide minimize surface areas projecting laterally from the housing such that a push inward against a button and then a push at a right angle with the same finger will likely involve the finger slipping off the button and the button relocking the slide. Where a stronger coil spring (i.e., one or more of coil springs 120, 146) is present, a squeezing or pinching action provides sufficient force against the longitudinally extending faces of the button and slide to move the slide, and thus latch, in the first direction to open the gate. Where a deep button push is present (i.e., a relatively long slot 118 and/or relatively long tabs 114), the second button with its relatively deep engagement keeps the latch from sliding even if one button is pushed sufficiently inwardly to its unlocked position. These two features yet further minimize use of the gate by children. Instead of such relatively strong coil spring (i.e., one or more of coil springs 120, 146), a coil spring (i.e., one or more of coil springs 120, 146) of a lesser strength may be used. Instead of a relatively deep button push (i.e., a relatively long slot 118 and/or relatively long tabs 114), a shallower button push may be utilized. A coil spring (i.e., one or more of coil springs 120, 146) of lesser strength permits the latch to slide upon operation of a first button/first slide combination. A relatively shallow button push (i.e., a relatively shallow slot 118 and/or relatively short tabs 114) may permit the second button to disengage from the housing when the first button/first slide combination begin to slidingly push on the latch.

Another advantage of the present invention is that the opposing buttons and slides provide an ergonomic fit to a hand of a user opening the gate. A user may use his or her thumb and first finger to squeeze the buttons and then, while keeping his or her thumb and first finger at the squeeze locations, slide the thumb and first finger in a first direction to slide a distal end section of a latch out of a latch receptor to permit the user to swing the gate open with the very hand that is doing the squeezing and sliding. The opening of the gate is thereby a one-handed operation.

Another advantage of the present invention is that the gate latch apparatus is, after being opened, easy to close. The thumb and first finger release the buttons, whereupon the latch slides automatically in the second direction to the latch receiver and the buttons pop back to a normal position ready to be squeezed again.

Another advantage of the present invention is that a user may squeeze the buttons and slide the slides with either the left or right hand whether the user is on one side of the gate or on the other side of the gate.

DESCRIPTION

Figure 1:
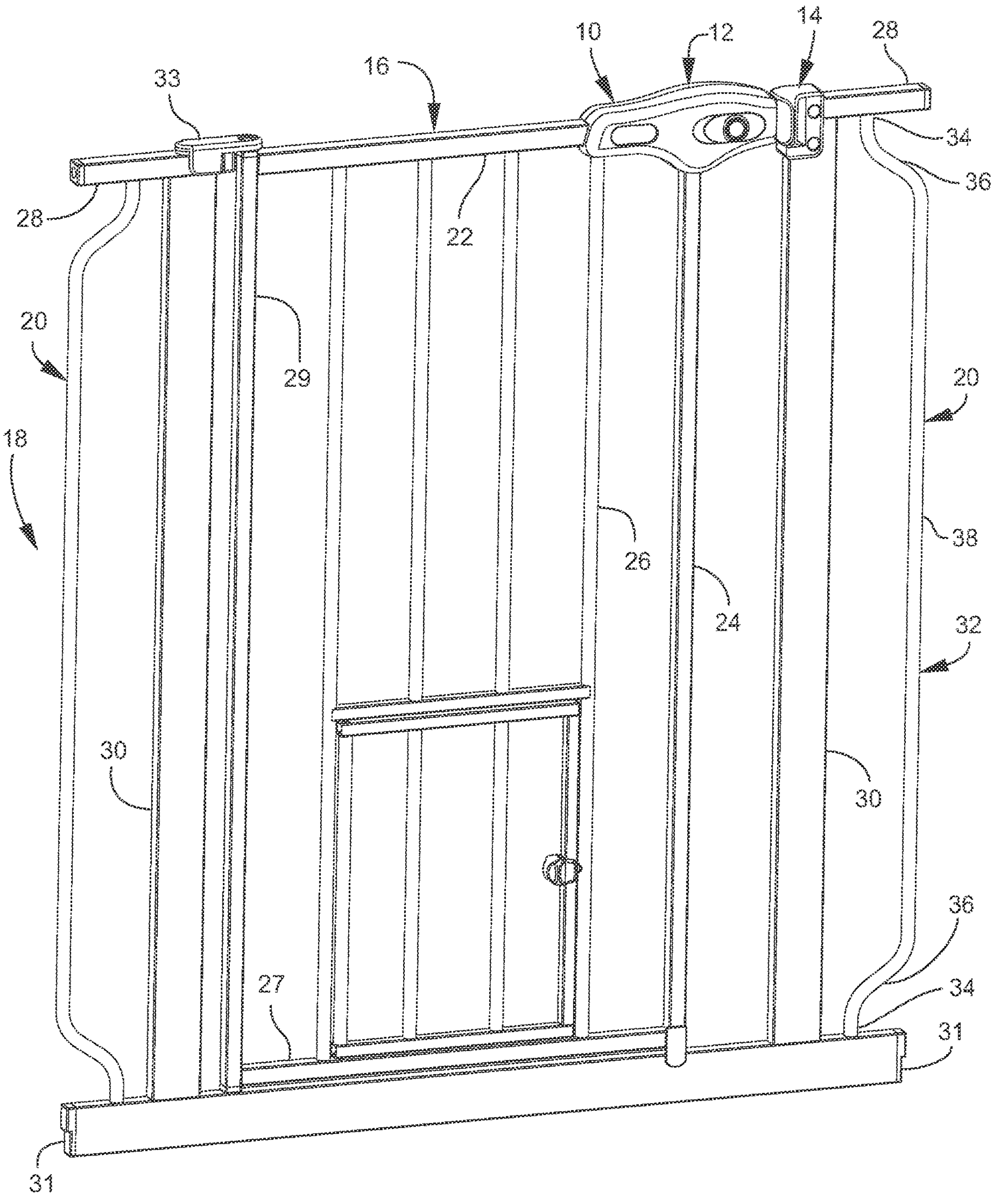
FIG. 1 is a front perspective view of the present gate latch apparatus in a residential safety barrier where the gate latch apparatus is employed between a gate of the residential safety barrier and a barrier side portion of the residential safety barrier.
Figure 2:
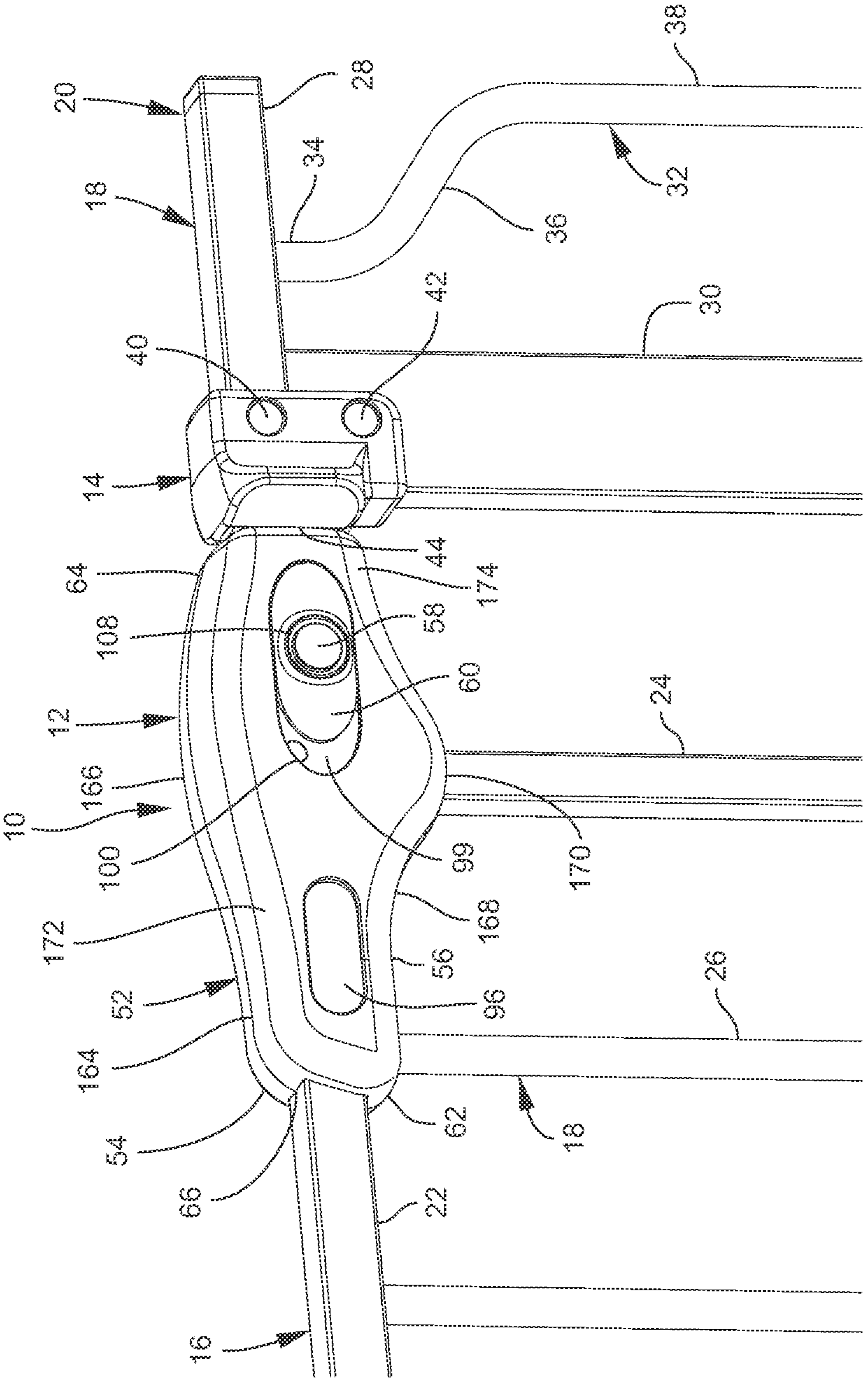
FIG. 2 is a detail front perspective view of the gate latch apparatus of FIG. 1.

As shown in FIGS. 1 and 2, the reference numeral 10 indicates the present gate latch apparatus. Gate latch apparatus 10 includes a latch component 12 and a latch receptor component 14. The latch component 12 is fixed to a gate 16 of a residential safety barrier 18. The latch receptor component 14 is fixed to a first barrier portion 20 of the residential safety barrier 18.

The gate 16 includes a topmost horizontal support member 22, an end vertical support member 24, and an intermediate vertical support member 26. The gate 16 further includes a bottommost horizontal support member 27 and another end vertical support member 29 that is opposite of end vertical support member 24. Vertical support members 24, 26 and 29 extend to and between the topmost horizontal support member 22 and the bottommost horizontal support member 27. The end vertical support member 29 that is opposite of vertical support member 24 swings on a vertical axis between topmost horizontal support member 22 and the bottommost horizontal support member. Gate 16 includes four intermediate support members 26 that run parallel to end support members 24, 29 and also extend between topmost horizontal support member 22 and the bottommost horizontal support member 27. Topmost horizontal support member 22 extends beyond the end vertical support member 24. Gate 16 swings in the residential safety barrier 18 on the axis defined by end vertical support member 29. Gate 16 swings to both sides of the residential safety barrier 18. Topmost horizontal support member 22, end vertical support members 24 and 29, intermediate support members 26, and bottommost horizontal support member 27 are tubular. Topmost horizontal support member 22 is square or rectangular in section and includes four sides.

First barrier portion 20 includes a topmost horizontal support member 28 and an end vertical support member 30. First barrier portion 20 further includes a vertical support member 32 having an upper straight vertical portion 34, a downwardly and outwardly extending portion 36 and an intermediate straight vertical portion 38. Vertical support members 30, 32 extend between topmost horizontal support member 28 and a bottommost horizontal support member 31. Topmost horizontal support member 28, vertical support member 30, and bottommost horizontal support member 31 are tubular. Vertical support member 32 may be in the nature of a solid rod or may be tubular if desired. Support member portions 34 and 36 are also found adjacent to the bottommost horizontally extending support member 31.

Barrier 18 includes a second barrier portion 20 that is identical to the first barrier portion 20, except that the second barrier portion 20 includes a gate pivot base 33 instead of the latch receptor component 14. Gate pivot base 33 is rigidly affixed to topmost horizontally extending member 28 and pivotally affixed to the upper end of the end vertical support member 29 of the gate 16. A bottom pivot pin is engaged between the lower end of vertically extending end member 29 and the bottommost horizontally extending support member 31.

Bottommost horizontally extending support member 31 extends to and between the first and second barrier portions 20 and forms part of each of the first and second barrier portions 20. Bottommost horizontally extending support member 31 confronts, is adjacent to, and is spaced from the bottommost horizontally extending support member 27 of gate 16.

Barrier 18 may be engaged in the frame of a doorway between two door jambs. Two hand wheels or hand screws may be engaged on shafts extending from the outer ends of the topmost horizontally extending support members 28 and another set of two hand wheels or hand screws may be engaged on shafts extending from the outer ends of the bottommost horizontally extending support member 31.

Barrier 18 may be a pressure mounted gate or barrier. That is, barrier 18 may be manufactured where one or more of the vertical support members 30 extend upwardly and outwardly relative to the bottommost horizontally extending support member 31. Then, when the hand wheels are operated, one of more of the upper ends of the vertical support members 30 are drawn inwardly, such as to draw the latch receptor component 14 into an operating relationship with latch component 12.

Barrier 18 may be manufactured as a stand along gate or barrier. In such an embodiment, laterally extending feet may be engaged to the outer ends of the bottommost horizontally extending support member 31 to keep the barrier 18 in an upright position.

Latch receptor component 14 is fixed with a first pin 40 to topmost horizontal support member 28 and with a second pin 42 to end vertical support member 30. Pins 40, 42 may be rivets. Pins 40, 42 extend laterally completely through latch receptor component 14 and laterally completely through topmost horizontal support member 28 and end vertical support member 30. As shown in FIG. 2, latch receptor component 14 includes a latch receptor 44 that captures a distal end section 46 of a latch 48. Latch receptor component 14 includes a pair of beveled sides 50 that lead into the latch receptor 44. When gate 16 is swung shut, the distal end section 46 may hit one of the beveled sides 50, which causes the distal end section 46 to retract and then, as the gate 16 continues toward the closed position, the distal end section 46 will pop into the latch receptor 44.

Latch component 12 includes a housing 52 having first and second housing sections 54, 56 that are substantially mirror images of each other. Housing sections 54, 56 are divided by a longitudinally extending vertical plane. Latch component 12 further includes a pair of externally accessible buttons 58 and externally accessible slides 60.

The exterior face of slide 60 includes a periphery. Button 58 includes an exterior face. The exterior face of button 58 is contained within the periphery of the exterior face of slide 60. Button 58 and slide 60 can be referred to as a two-part button, where the first part is the button 58 that engages the housing 52 and the second part is the slide 60 that is slideable after the first part, the button 58, is pushed inwardly to unlock the second part, the slide 60.

Housing 52 includes a proximal end 62 and a distal end 64. Proximal end 62 includes a proximal opening 66 for the topmost horizontal support member 22. Proximal opening 66 is a square or rectangular opening when viewed from the end. Proximal opening 66 is formed by three edges in housing section 54 and three edges in housing section 56. While proximal opening 66 of housing 52 accepts topmost horizontal support member 22, distal end 64 of housing 52 includes a distal opening 68 that accepts and guides back and forth a sliding of the distal latch end section 46 of latch 48. Distal opening 68 can be described as a toothed profile 68 or a triple channel profile or a triple dado profile 68 or a triple slot opening 68 or an undulating profile 68, where each of the housing sections 54, 56 includes one toothed profile 68. Distal latch end section 46 includes an upper head or prong 70, a lower head or prong 72, an intermediate head or prong 74. Prongs 70, 72, 74 are interconnected by a vertically extending brace 76. Each of the slots or dadoes of each of the profiles 68, when paired with its opposing slot of the other housing section, functions as a guide for its respective head 70, 72, 74. Latch 48 is coaxial with topmost horizontally extending support member 22.

The housing edges forming proximal end opening 66 support the housing 52 relative to the topmost horizontally extending support member 22. Housing 52 further includes a horizontal planar platform 78 for supporting a lower face of the topmost horizontally extending support member 22 and an upper horizontal planar retainer 80 opposing the platform 78. Platform 78, retainer 80, and the upper and lower housing edges forming proximal opening 66 minimize vertical movement of the housing 52 relative to the topmost horizontally extending support member 22. Housing 52 further includes a laterally extending piece 82 having a vertical edge 84 that confronts topmost horizontally extending support member 22. Vertical edge 84 of each of the housing sections 54, 56 and the vertical edges of housing sections 54, 56 that form proximal opening 66 minimize lateral or side to side movement of the housing 52 relative to the gate 16.

Each of the housing sections 54, 56 further includes a pair of vertically extending retainer plates 86 spaced apart from each other for supporting the housing 52 relative to vertically extending end support member 24 and for minimizing longitudinal or forward and back movement of the housing 52 relative to the gate 16. Retainer plates 86 confront a first bottom opening 88 formed in the housing 52 for receiving the vertically extending end support member 24. First bottom opening 88 is formed in part by longitudinally extending edge 90 that minimizes lateral or side to side movement of the vertically extending end support member 24 relative to the gate 16. Laterally extending edges forming part of first bottom opening 88 also contribute toward minimizing longitudinal or forward and back movement of the housing 52 relative to the gate 16.

Housing 52 further includes a second bottom opening 92 for receiving intermediate vertical support member 26. Each of the housing sections 54, 56 includes a circular edge 94 that extends for 180 degrees and that forms one-half of second bottom opening 92. This circular edge 94 minimizes both lateral and longitudinal movement of the housing 52 relative to the gate 16.

Topmost horizontally extending member 22 has a first junction with intermediate vertically extending support member 26 and a second junction with vertically extending support member 24. These first and second junctions are disposed inside of housing 52. Topmost horizontally extending member 28 includes a junction with vertically extending end member 30, which junction is disposed inside the housing of the latch receptor component 14.

Each of the side faces of the housing sections 54, 56 includes a depression 96 formed therein for receiving a label so as to designate the brand of the residential safety barrier 18. The depression 96 is not a through opening.

Each of the side faces of the housing sections 54, 56 includes a track 100 for the slide 60. Proximal and distal end portions of the track 100 are curved. Portions of the track 100 between the end portions are straight. Slide 60 includes a head or externally accessible portion 102 that includes a circumferential edge or rider 104. Edge 104 rides on track 100. Edge 104 includes proximal and distal end portions that are curved and straight portions between the curved proximal and distal end portions. Slide 60 slides forwardly and rearwardly in track 100.

Figure 4:
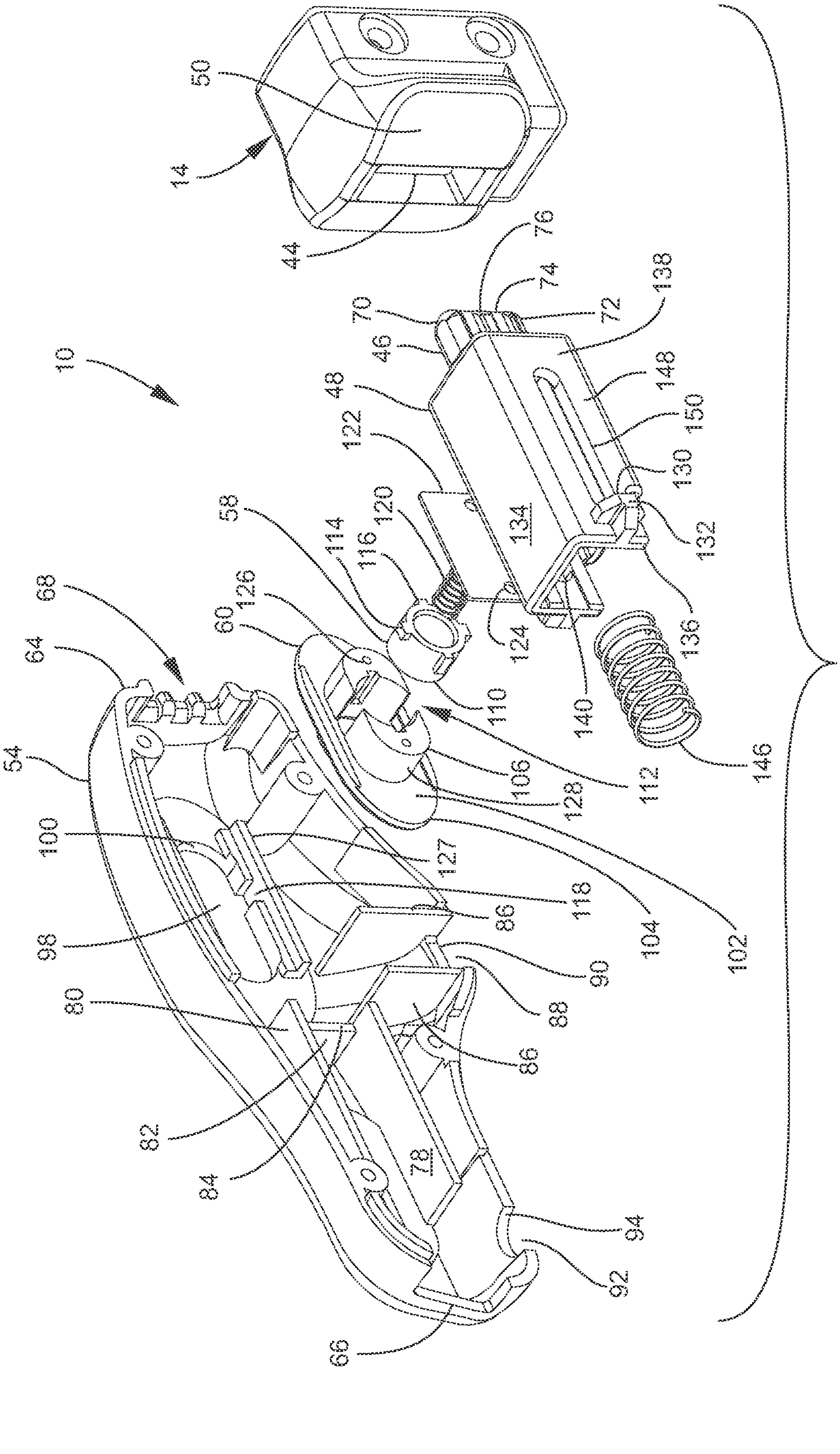
FIG. 4 is an exploded perspective view of a portion of the gate latch apparatus of FIG. 2.
Figure 5:
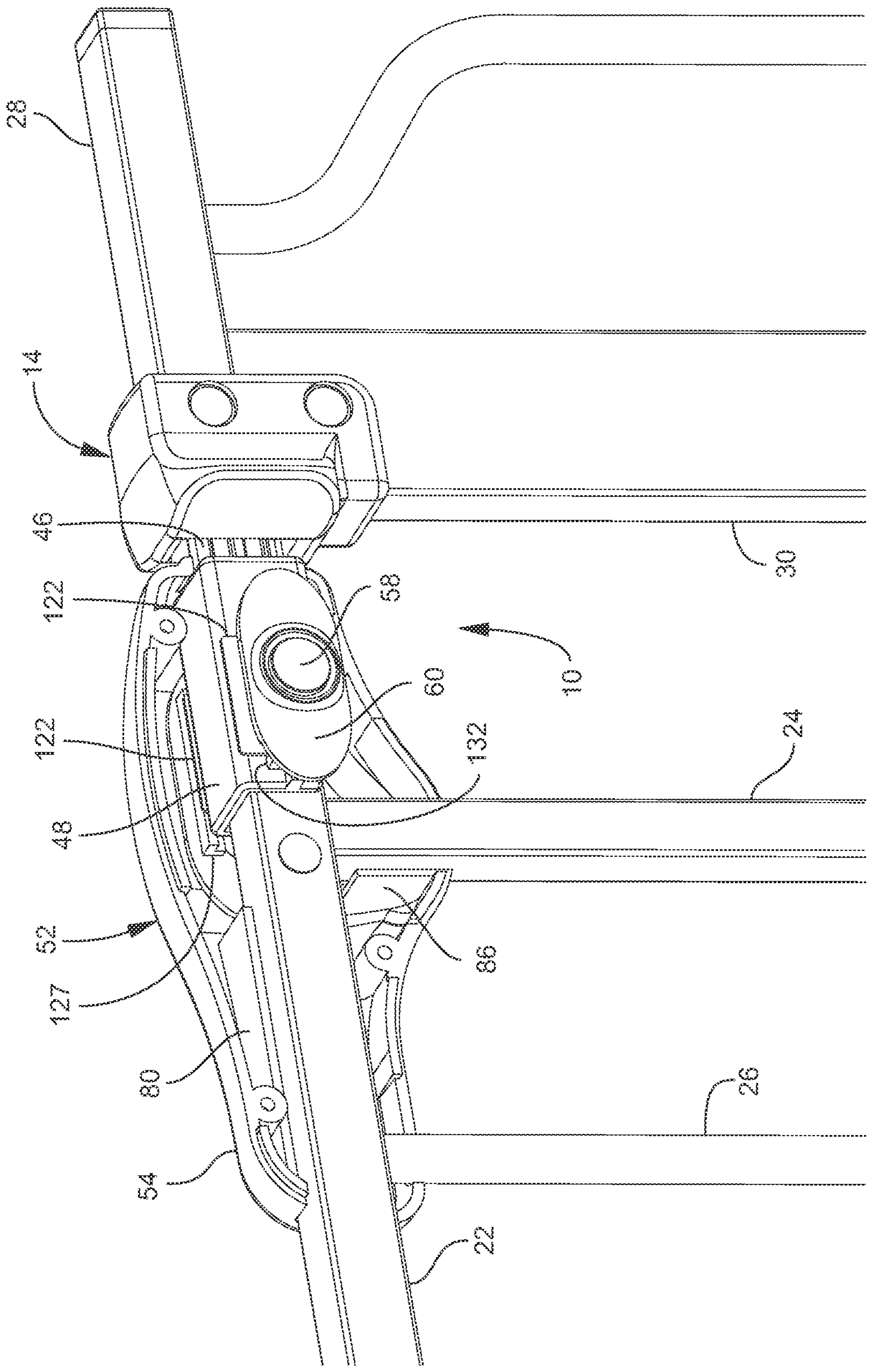
FIG. 5 is a side perspective view of the gate latch apparatus of FIG. 2 with a housing portion removed and shows the latch of the gate latch apparatus in a closed position.
Figure 10:
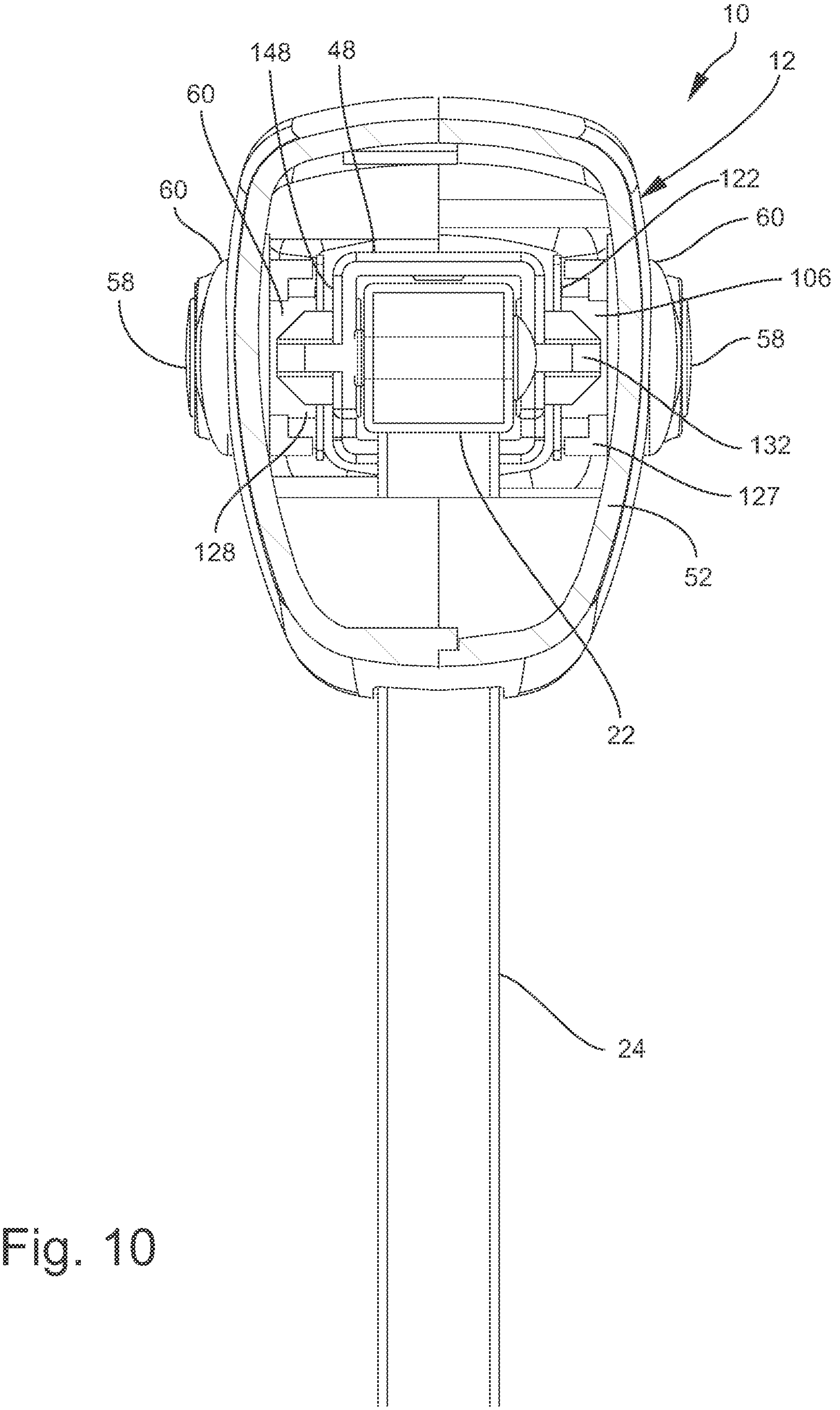
FIG. 10 is a section view along lines 10-10 of FIG. 3.

Within the track 100 is a through opening 98 for a base 106 of slide 60, as shown in FIG. 4. Set inwardly from an outer surface or face of housing 52 is a depression 99, as shown in FIG. 2 and FIG. 10. The inner face of slide head 102 confronts and rides on the depression 99, as shown in FIG. 10. Depression 99, from a side view, may take generally the shape of a crescent or curved sickle shape when covered by a portion of slide head 102 and when uncovered by a portion of slide head 102.

Slide base 106 extends inwardly from head 102. Head 102 includes a circular opening 108 for receiving a cylindrical portion 110 of button 58. Base 106 includes a slotted opening 112 that engages upper and lower locking tabs 114 and side guide tabs 116 of button 58. Slotted opening 112 includes upper and lower slots for receiving locking tabs 114 and side guide slots for receiving side guide tabs 116. Track 100 of housing 52 includes upper and lower slots 118 for receiving locking tabs 114. Circular opening 108 of head 102 communicates with slotted opening 112 of the base 106 such that the cylindrical portion of the button 58 extends through each of the openings 108, 112.

Button 58 includes a closed outer end at the end of the cylindrical portion 110. A finger or thumb pushes on this closed outer end. Opposite the closed outer end is an open end for reception of a coil spring 120. One end of the coil spring 120 confronts the inside face of the closed outer end of button 58. The other end of coil spring 120 confronts a retaining plate 122. Button 58 is depressible inwardly on a button axis. This button axis is at a right angle or transverse angle relative to an axis on which the slide 60 slides.

Retaining plate 122 is fixed with pin connectors to the base 106 such that an inside face of the base 106 confronts an outer face of the plate 122. Pin connectors extend through hole 124 in retaining plate 122 and hole 126 in slide base 106. Retaining plate 122 has a height greater than the height of the head 102 of slide 60. When the slide head 102 is in the track 100, the outside face of retaining plate 122 confronts the inside edge of upper and lower longitudinally extending plates 127 that are disposed above and below track 100 to keep slide head 102 in the track 100. When the slide 60 is slid in the first and second directions, retaining plate 122 also slides in the first and second directions in a confronting relationship to the inner edge of the plates 127.

With the fixing of the retaining plate 122 to the slide base 106, tabs 114, 116 are always located in their respective slots in the slide base 106. However, upper and lower tabs 114 slide in and out of housing slots 118 when the button 58 is pushed inwardly. When the tabs 114 are pushed out of slots 118, the slide 60 is slideable in a first direction. This first direction is a direction from distal end 64 to proximal end 62 and is the direction that the latch 48 slides when the latch 48 slides out of the latch receptor 44. A second direction is from proximal end 62 to distal end 64 and is the direction that the latch 48 takes when the latch 48 slides into the latch receptor 44.

Slide base 106 includes a proximal end 128. This proximal end 128 pushes against the distal end or transversely extending or laterally extending face 130 of a block 132 that laterally extends from latch 48 so as to move the latch 48 in the first direction out of the latch receptor 44.

Latch 48 slides on topmost horizontally extending support member 22. Latch 48 is one-piece and integral. Latch 48 includes a top 134, bottom 136, and a pair of sides 138, which form a proximal end opening 140. Topmost horizontally extending support member 22 extends into the opening 140. A distal end of the support member 22 confronts the distal end section or male member 46 of the latch 48. The distal end section 46 is a closed end of the latch 48. Latch 48 further includes and is integral and one-piece with male member 46.

Latch 48 includes a circumferentially extending section, made up of top 134, bottom 136, and sides 138 that preferably extend over more than 50% of the circumference of the horizontally extending support member 22, more preferably over 75% of the circumference of the horizontally extending support member 22, and most preferably about 100% of the horizontally extending support member 22.

Each of the top 134 and bottom 136 of the latch 48 optionally includes a longitudinally extending slot. Each of such slots includes a distal end and a proximal end. These ends are stops that hit an optional pin that extends vertically through such slots of the top 134 and bottom 136 and that further extends through the topmost horizontally extending member 22.

A coil spring 146 is inserted into the proximal opening 140 and pushed to rest against the closed distal end section 46. Then the latch 48 is slid onto the end of the topmost horizontally extending member 22. One end of the coil spring 146 brings pressure to bear upon the closed distal end section 46. The other end of the coil spring 146 brings pressure to bear against and/or is engaged to rivet or pin 178, which extends through support member 22.

In other words, one end of the coil spring 146 engages or confronts the shaft of the pin 178. The other end of the coil spring 146 confronts the closed distal latch end section 46 such that the coil spring 146 is normally biased in the closed position where the distal latch end section 46 is in the latch receptor 44.

Figure 8:
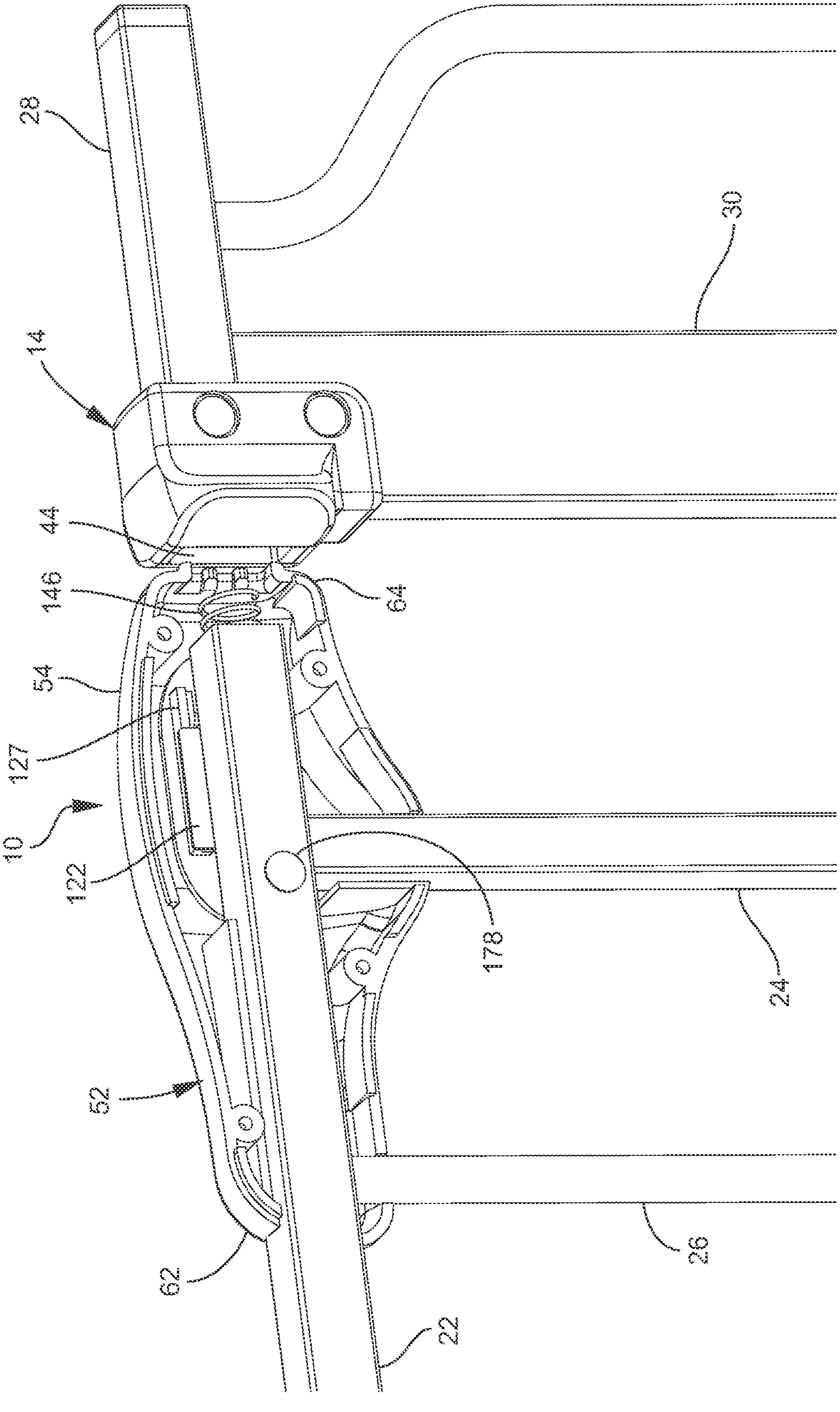
FIG. 8 is a side perspective view of the gate latch apparatus of FIG. 2 with a housing portion, button, slide, and portion of the latch removed.

Heads or prongs 70, 72, 74 are formed of a solid plastic such that the distal end of coil spring 146 confronts the proximal end of the distal end section 46 of latch 48 or the proximal ends of the heads 70, 72, 74. Latch 48 is tubular from proximal opening 140 to the proximal ends of the prongs 70, 72, 74. In FIG. 8, the distal end section 46 having the prongs 70, 72, 74 has been removed for illustration purposes to, for example, show the inside of the distal end 64 of the housing 52. The distal end of the coil spring 146 can be seen bringing pressure to bear on the proximal end of distal end section 46 or male member 46 of latch 48 in the section view of FIG. 9.

When the latch 48 is drawn in the first direction by the slides 60 to unlock the gate 16, the coil spring 146 is compressed. When the slides 60 are released, the coil spring 146 expands so as to automatically slide the latch 48 in the second direction. When the latch 48 is slid in the second direction, the faces 130 push against the proximal end 128 of the slide base 106 to return the slides 60 to their normal distal positions and to return the male end 46 into the latch receptor 44 if the gate 16 is aligned with the barrier portion 20.

Each of the latch sides 138 includes a flat portion 148 distal of the blocks 132. This flat portion 148 includes a longitudinally extending slot 150. Slot 150 allows the assembler to see the position of the coil spring 146 before and after placement of the latch 48 on the end of the topmost horizontally extending support member 22. The flat portion 148 confronts the inner face of retaining plate 122. The outer face of the retaining plate 122 confronts the inner edges of plate 127 to keep the slide 60 in the housing 52 and track 100.

When an inward force is placed upon slide 60, the inner face of slide head 102 confronts the outer surface of depression 99. The slide base 106 may bring pressure to bear on the retaining plate 122, which in turn may bring pressure to bear upon flat portion 148 and latch 48 as a whole such that slide 60 is maintained in track 100 and housing 52. The inner face of plate 122 may bring pressure to bear upon flat portion 148 so as to prevent slide 60 from being pushed too far inwardly. The outer face of plate 122 may bring pressure to bear upon plates 127 so as to prevent slide 60 from being pushed or drawn too far outwardly.

Figure 6:
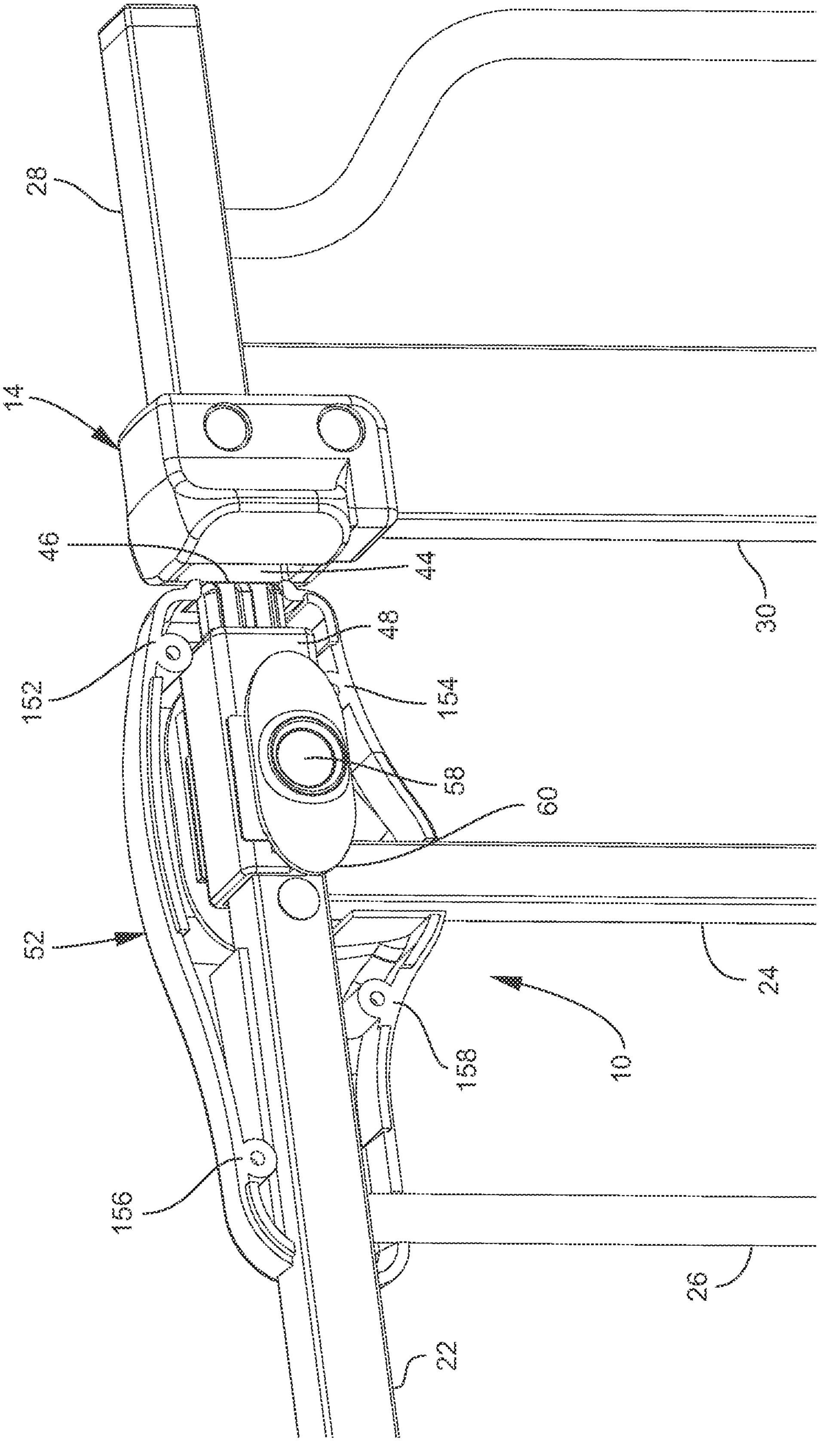
FIG. 6 is a side perspective view of the gate latch apparatus of FIG. 2 with a housing portion removed and shows the latch of the gate latch apparatus in an open position.
Figure 7:
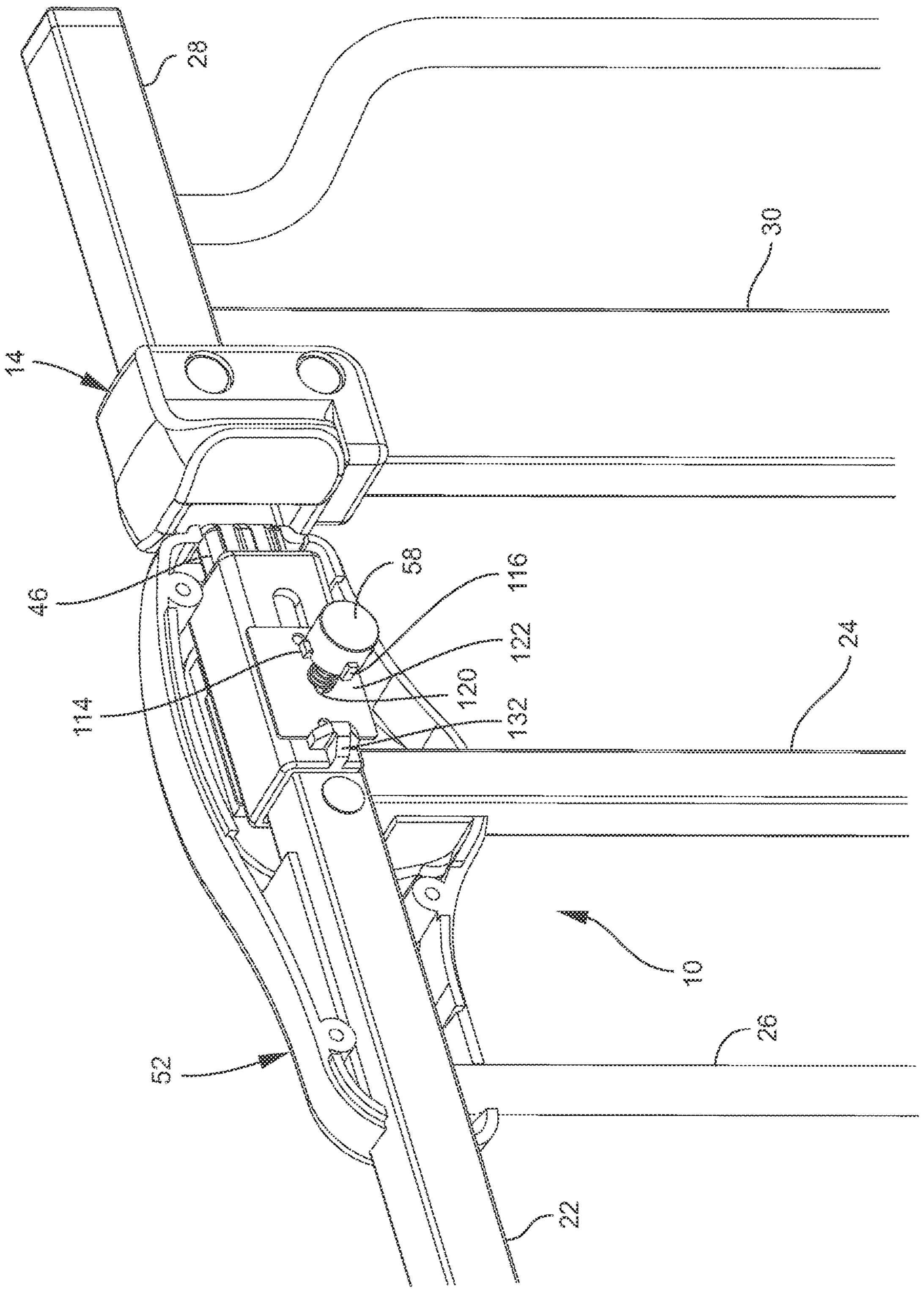
FIG. 7 is a side perspective view of the gate latch apparatus of FIG. 2 with a housing portion removed and with a slide removed.

As shown in FIG. 6, each of the housing sections 54, 56 are pinned, riveted, or screwed together utilizing a set of four bosses or apertured pin receiving tubes 152, 154, 156, 158. Tubes 152, 154, 156, 158 have, respectively, upper distal, lower distal, upper proximal, and lower proximal locations. Tubes 152, 154, 156, 158 extend laterally.

Figure 3:
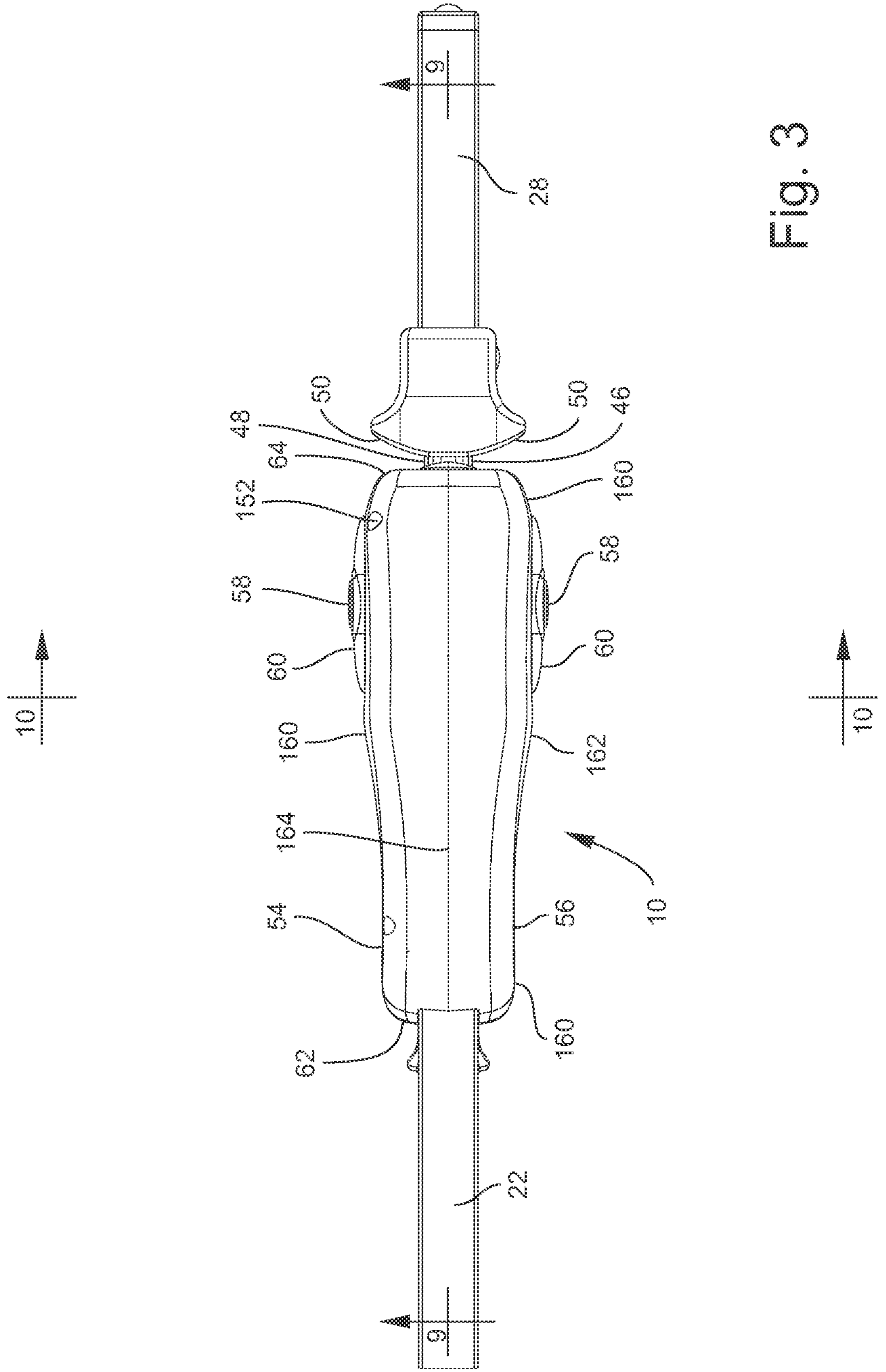
FIG. 3 is a top view of the gate latch apparatus of FIG. 2.

As shown in FIG. 3, each of the housing sections 54, 56 has a side face 160. Side face 160 runs from proximal end 62 of housing 52 to distal end 64 of housing 52. As further appreciated from FIG. 3, the slide 60 and button 58 protrude outwardly from side face 160. This protuberance permits a user to feel the location of the slide 60 and button 58 with his or her fingers, thumb and hand. When a label is placed in depression 96, side face 160 is smooth with the exception of slide 60 and button 58 and the opening between the proximal end of the slide 60 and the proximal end of the track 100 when the slide 60 is at the distal end of the track 100 and the latch 48 is closed.

As further shown in FIG. 3, the outer or external surface of button 58 and the outer or external surface of slide 60 are generally flush with each other, where the flushness runs over a curved or spherical surface. While the outer face of the slide 60 is broken by the outer surface of the button 58 so as to permit a user to distinguish, such as at night, between the slide 60 and the button 58 with his or her fingers or thumbs, the outer surface of button 58 does not protrude or protrudes minimally beyond the curve defined by the outer surface of the slide 60. The outer surface of button 58 then is disposed inwardly of the outer face of the slide 60 when the button 58 is depressed such that at all times the button 58 is either generally flush with a curvature defined by the outer surface of slide 60 or inwardly of this curvature or inwardly or the outer surface of slide 60. This design, where the present latch assembly 10 is manufactured for such, minimizes the chances of one finger on one button and slide operating the latch 48 because there are no laterally extending or transversely extending surfaces areas against which a finger may push in the lateral direction. An attempt at a one finger operation on one side of the housing 52 results in the finger sliding off the button 58 and slide 60 as the finger moves from an inward lateral push upon button 58 to a sideways longitudinal push upon slide 60. Instead, the longitudinal force required to overcome the tension of the coil spring 146 is provided by a squeeze upon both of the button/slide pairs at the same time.

As further shown in FIG. 3, each of the side faces 150 tapers outwardly from the proximal end 62 to an intermediate location 162. From the intermediate location 162, the side faces 150 run generally parallel to each other to a location that is immediately proximal of, and adjacent to, distal end 64.

As shown in FIG. 2, an upper face 164 of the housing 52 tapers upwardly and distally from proximal end 62 to a peak 166. Peak 166 is on a vertical axis that, if extended directly downwardly, runs between the proximal and distal ends of track 100. From peak 166, upper face 164 tapers downwardly and distally to the distal end 64.

As shown in FIG. 2, a lower face 168 runs generally horizontally and distally from the proximal end 62 to a location about midway between openings 88 and 92, whereupon lower face 168 tapers downwardly and distally to a low point or lowest most location 170 at either side of opening 88. From opening 88, lower face 168 tapers upwardly and distally to the distal end 64.

Housing 52 includes a beveled transition from the upper face 164 to the side face 150. Housing 52 includes a beveled transition from the lower face 168 to the side face 150.

Figure 9:
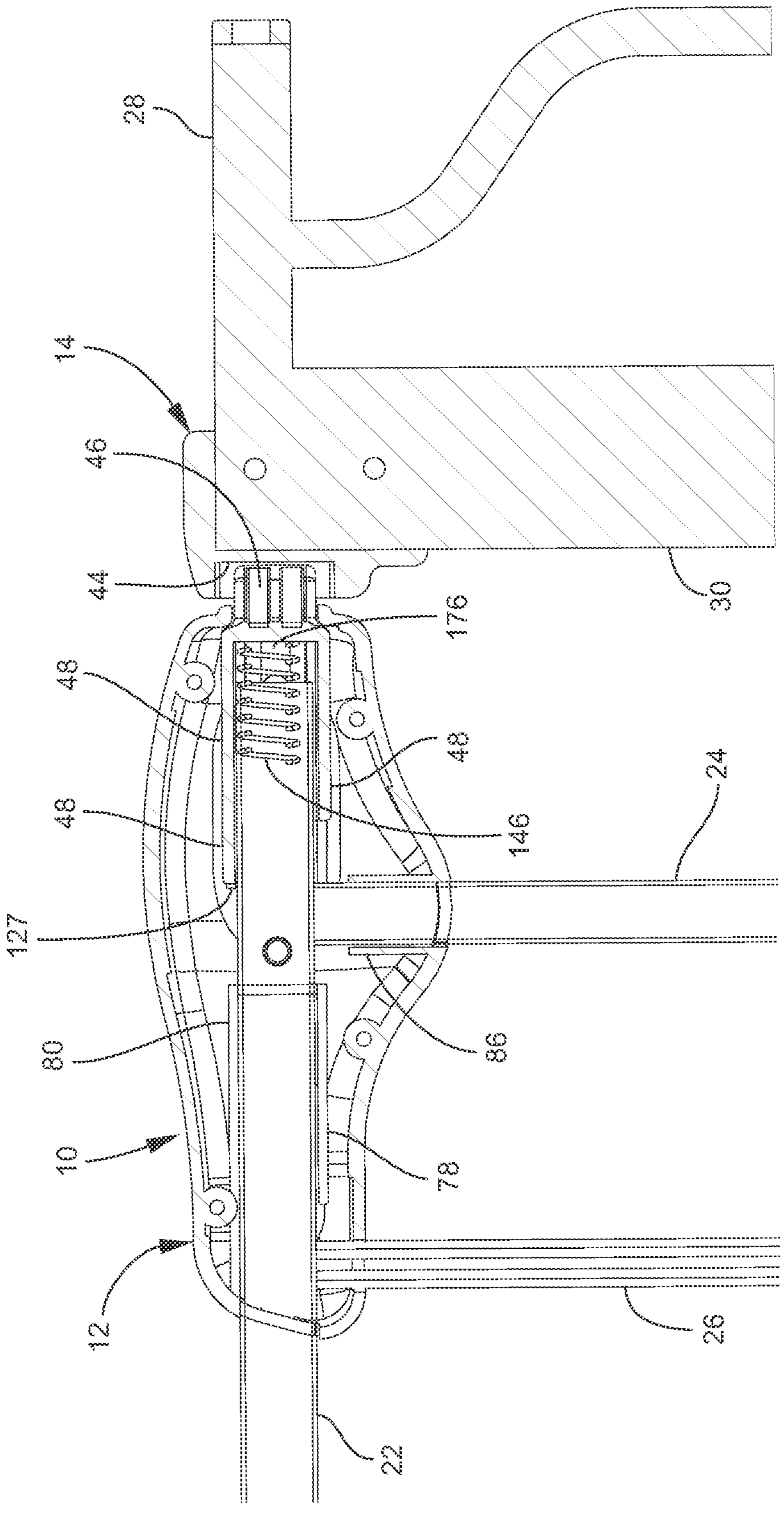
FIG. 9 is a section view along lines 9-9 of FIG. 3.

As shown in FIG. 9, the proximal end of the male member 46 includes a rearwardly extending center stem 176. The distal end of coil spring 146 is centered on the stem 176. Stem 176 limits vertical and side to side movement of the distal end of the coil spring 146.

As shown in FIG. 9, the latch top 134 extends in the proximal direction a greater distance that the latch bottom 136. When the latch 48 is open the proximal end of the latch bottom 136 may confront the vertical support member 24. The proximal ends of the latch top 134 and latch bottom 136 can also be seen in FIG. 4.

In operation, from the standpoint where the gate 16 is closed and the latch 48 is in the latch receptor 44, a user will approach gate 16 and reach out with his or her hand. By the topography of the housing side face 160, the user can find the slide 60 and button 58, which project outwardly from the side face 160. Then the user can distinguish by feel or by sight the slide 60 from the button 58. Then the user can squeeze buttons 58 toward each other, such as with the thumb and first finger of the same hand. As the buttons 58 are squeezed, tabs 114 will be pushed out slots 118, whereupon slides 60 become unlocked relative to the housing 52 and slideable from the distal ends of tracks 100. The user then keeps the buttons 58 pressed inwardly and slides the buttons 58 and slides 60 in the first direction toward the proximal end 62 of the housing. As the buttons 58 and slides 60 slide, the proximal ends 128 of the slide bases 106 push upon the lateral faces 130 of block portions 132 of the sides 138 of the latch 48. This action draws the latch 48 in the first direction and draws the distal end section 46 of latch 48 out of the latch receptor 44. The user may then open the gate 16 relative to the barrier portion 20. Then the user may release the buttons 58 and lift his or her hand from the housing 52, whereupon the coil spring 146 begins to expand and push the latch 48 in the second direction. As the coil spring 146 begins to expand, the block portions 132 push against the slide bases 106, which pushes slides 60 toward the distal ends of the tracks 100 until the tabs 114 of the buttons 58 snap back into slots 118. If the user has left the gate 16 open relative to the barrier portion 20, the user can swing the gate 16 closed, whereupon distal end section 46 of latch 48 hits one of the beveled sides 50, retracts, and then extends automatically into the latch receptor 44, thereby locking gate 16. If the user guides the gate 16 back with his or her hand to be aligned with the barrier portion 20 and then releases the buttons 58, the latch end section 46 slides back into the latch receptor 44 without hitting one of the beveled sides 50, thereby locking gate 16.

A number of features minimize the chances of the gate 16 being opened by operating just one button 58/slide 60 pair on one side of the housing 52. These features include the low profiles of the button 58 and slide 60 relative to the side faces 160 of the housing 52. While the slide 60 protrudes from side face 160 to permit a user to feel for example at night where the slide 60 and button 58 are, there is no such protrusion of the closed end of the button 58 relative to the curvature of the outer face of the slide 60 such that there is minimal or no lateral face on which a finger or thumb may push in the first direction until button 58 is pushed in. The lateral face that becomes available for pushing against are the portions of the slide head 102 that form opening 108 and that become exposed when the buttons 58 are pushed in. A finger that pushes in one button 58 and then pushes against this thin lateral face that becomes exposed will likely slip off of the thin lateral face, allowing the button 58 to again become locked in slot 118. Further, a finger or thumb operating just one button 58 and then attempting a movement in the first direction is unlikely to have sufficient power or strength to overcome the tension of the coil spring 146. Still further, the laterally extending sides of button 58 are inaccessible and inwardly of the outer surface of the slide 60 when tab 114 comes out of slot 118 such that the button 58 offers no laterally extending surface against which to push in the longitudinal direction. In contrast, a pinching action or squeezing action by its very nature minimizes or eliminates the amount of lateral or transverse surface area that is required to slide the slides 60 in the first direction and, at the same time, the squeeze keeps both buttons 58 depressed at the same time and, at the same time, the squeeze involves sufficient power to overcome the tension of the coil spring 146.

Other features that minimize or prevent the gate 16 from being opened by operating just one button 58/slide 60 pair on one side of the housing 52 include one or more relatively strong coil springs 120, 146, where a stronger coil spring 120 may aid in keeping tab 114 in slot 118, and where a stronger coil spring 146 may require more pressure, such as pressure from both sides of the latch 48, to slide the latch 48, and/or a relatively long slot 118 and/or a relatively long tab 114 to provide a relatively deep engagement between the slot 118 and tab 114.

Features that maximize or permit the gate 16 to be opened by operating just one button 58/slide 60 pair on one side of the housing 52 include relatively less strong coil springs 120, 146, and/or relatively short tabs 114, and/or relatively short shallow slots 118.

A set of four devices (two push-buttons 58 and two push-slides 60) may thus be operated as one unit to slide the latch 48 in the first direction to open the gate 16. One push-button 58 and one push-slide 60 on one housing section 54 may be operated by one finger and the other push-button 58 and the other push-slide 60 on the other housing section 56 may be operated by the thumb, where the thumb and finger work together in a squeezing action.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. In combination with a residential safety barrier, a gate latch apparatus for the residential safety barrier, the residential safety barrier having a gate and a barrier portion confronting the gate, the gate being openable relative to the barrier portion, the gate having a horizontally extending support member, a first vertically extending support member, the horizontally extending support member and first vertically extending support member engaged to each other at a first junction, the gate latch apparatus comprising:

a) a latch receptor engaged to the barrier portion;

b) a housing engaged to the gate across from the latch receptor, the housing enclosing a portion of the horizontally extending support member, the housing enclosing a portion of the first vertically extending support member, the housing enclosing the first junction where the junction is a T-junction;

c) a latch in the housing and having a latch end, the latch engaging the horizontally extending support member and being slideable thereon, the latch being slideable in first and second directions, the latch being slideable in the first direction to slide the latch end out of the latch receptor, the latch being slideable in the second direction to slide the latch end into the latch receptor; and d) the horizontally extending support member having an open end adjacent to the latch receptor of the barrier portion, the latch end having a closed end portion adjacent to the open end of the horizontally extending support member, and a spring engaged in the horizontally extending support member and engaging the closed end portion of the latch end.

2. The combination of claim 1 and the gate having a second vertically extending support member, the horizontally extending support member and second vertically extending support member engaged to each other at a second junction, wherein the housing encloses a portion of the second vertically extending support member, and the housing enclosing the second junction.

3. The combination of claim 1 and the horizontally extending support member having four sides, wherein the latch includes four sides that extend over four of the four sides of the horizontally extending support member.

4. The combination of claim 1, wherein the latch includes two opposing sides that extend over two opposing sides of the horizontally extending support member, each of the opposing sides of the latch including a longitudinally extending slot, each of the longitudinally extending slots being a through slot.

5. The combination of claim 1, wherein the latch includes an open end.

6. The combination of claim 1, wherein the latch is adjacent to the first junction of the horizontally extending support member and the first vertically extending support member.

7. The combination of claim 1, wherein the housing includes an upper side, wherein the latch includes an open end, and where the upper side of the housing is spaced from the open end of the latch.

8. The combination of claim 1, wherein the housing includes a lower side, wherein the latch includes an open end, and where the lower side of the housing is spaced from the open end of the latch.

9. The combination of claim 1, wherein the housing includes internal vertically extending walls for receiving the first vertically extending support member and further includes internal horizontally extending walls for receiving the horizontally extending support member, said internal vertically extending walls and said internal horizontally extending walls being within the housing.

10. In combination with a residential safety barrier, a gate latch apparatus for the residential safety barrier, the residential safety barrier having a gate and a barrier portion confronting the gate, the gate being openable relative to the barrier portion, the gate having a horizontally extending support member, a first vertically extending support member, the horizontally extending support member and first vertically extending support member engaged to each other at a first junction, the gate latch apparatus comprising:

a) a latch receptor engaged to the barrier portion;

b) a housing engaged to the gate across from the latch receptor, the housing enclosing a portion of the horizontally extending support member, the housing enclosing a portion of the first vertically extending support member, the housing enclosing the first junction where the junction is a T-junction;

c) a latch in the housing and having a latch end, the latch engaging the horizontally extending support member and being slideable thereon, the latch being slideable in first and second directions, the latch being slideable in the first direction to slide the latch end out of the latch receptor, the latch being slideable in the second direction to slide the latch end into the latch receptor; and d) the horizontally extending support member having four sides, wherein the latch includes four sides that extend over four of the four sides of the horizontally extending support member.

11. In combination with a residential safety barrier, a gate latch apparatus for the residential safety barrier, the residential safety barrier having a gate and a barrier portion confronting the gate, the gate being openable relative to the barrier portion, the gate having a horizontally extending support member, a first vertically extending support member, the horizontally extending support member and first vertically extending support member engaged to each other at a first junction, the gate latch apparatus comprising:

a) a latch receptor engaged to the barrier portion;

b) a housing engaged to the gate across from the latch receptor, the housing enclosing a portion of the horizontally extending support member, the housing enclosing a portion of the first vertically extending support member, the housing enclosing the first junction where the junction is a T-junction;

c) a latch in the housing and having a latch end, the latch engaging the horizontally extending support member and being slideable thereon, the latch being slideable in first and second directions, the latch being slideable in the first direction to slide the latch end out of the latch receptor, the latch being slideable in the second direction to slide the latch end into the latch receptor; and d) wherein the latch includes two opposing sides that extend over two opposing sides of the horizontally extending support member, each of the opposing sides of the latch including a longitudinally extending slot, each of the longitudinally extending slots being a through slot.

* * * * *